United States Patent
Latu et al.

(10) Patent No.: US 11,861,241 B2
(45) Date of Patent: Jan. 2, 2024

(54) PRODUCTION OF MAIL BATCHES IN A CLOUD ENVIRONMENT AND IMPROVEMENT IN MAIL PRODUCTION SYSTEM BY WHICH A MAIL BATCH CAN BE EASILY DISTRIBUTED TO MULTIPLE REMOTE PRODUCTION SITES

(71) Applicant: QUADIENT TECHNOLOGIES FRANCE, Bagneux (FR)

(72) Inventors: Yves Latu, Orleans (FR); Gabriel Santangeli, Savigny sur Orge (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 0 days.

(21) Appl. No.: 18/101,252

(22) Filed: Jan. 25, 2023

(65) Prior Publication Data

US 2023/0236774 A1    Jul. 27, 2023

(30) Foreign Application Priority Data

Jan. 27, 2022    (EP) .................................... 22305086

(51) Int. Cl.
*G06F 3/12*    (2006.01)
*H04N 1/00*    (2006.01)

(52) U.S. Cl.
CPC .......... *G06F 3/1207* (2013.01); *G06F 3/1259* (2013.01); *H04N 1/00363* (2013.01)

(58) Field of Classification Search
None
See application file for complete search history.

(56) References Cited

U.S. PATENT DOCUMENTS 6,823,237 B1    11/2004    Bodie
9,053,584 B2 *   6/2015    Otey ..................... G06F 3/1218
(Continued)

FOREIGN PATENT DOCUMENTS

EP    3 029 618 A1    6/2016
EP    3 276 560 A1    1/2018
EP    3 843 049 A1    6/2021

OTHER PUBLICATIONS

Extended European Search Report for EP 22305086.5 dated Jul. 21, 2022, 10 pages.

*Primary Examiner* — Haris Sabah
(74) *Attorney, Agent, or Firm* — Cozen O'Connor

(57) ABSTRACT

Producing mail batches on inserters located at multiple production sites, includes: preparing a print job and a job file for a mail batch; allocating the mail batch to at least one production site with production software running on a production server; flagging the mailpieces for the production site; sending the print job to a printer of the production site; printing the documents; delivering the documents an inserter of the production site; scanning a first mailpiece identifier on a first document; sending an initial request to the production server including the first mailpiece identifier and identifying the inserter and the production site; verifying via the production software that the first mailpiece identifier is valid; and sending back to the inserter a confirmation message for processing the mailpiece wherein the confirmation message includes a list of valid mailpiece identifiers neighbouring the first mailpiece identifier in the job file.

15 Claims, 3 Drawing Sheets

(56) References Cited

U.S. PATENT DOCUMENTS

| | | | | |
|---|---|---|---|---|
| 2004/0125406 A1* | 7/2004 | McManus | ........ | G07B 17/00467 |
| | | | | 382/101 |
| 2008/0285068 A1* | 11/2008 | Rai | ....................... | G06F 3/1205 |
| | | | | 358/1.15 |
| 2016/0253140 A1* | 9/2016 | Liebelt | .................. | G06F 3/1211 |
| | | | | 358/1.15 |
| 2018/0024523 A1* | 1/2018 | Ashworth | .............. | G06Q 30/01 |
| | | | | 700/227 |

* cited by examiner

PRODUCTION OF MAIL BATCHES IN A CLOUD ENVIRONMENT AND IMPROVEMENT IN MAIL PRODUCTION SYSTEM BY WHICH A MAIL BATCH CAN BE EASILY DISTRIBUTED TO MULTIPLE REMOTE PRODUCTION SITES

TECHNICAL FIELD

The present invention relates to mad processing and customer communication, and notably to improvements in mail production systems incorporating paper handling machines used for inserting documents and inserts into envelopes.

BACKGROUND

Despite a noticeable decrease in printed correspondence, physical mail remains a preferred and efficient communication channel for many customer segments. Letters have undoubtedly more substance than emails and a higher propensity to capture and retain customer attention. Modern output management technology allows the generation of highly personalized documents, whether a printed communication is a single page letter or include a variety of inserts. The production of a large batch of mailpieces poses some challenges in terms of integrity. Production systems within the print and mailing industries often use the terminology of closed loop and open loop to describe their integrity features.

Inserters can be operated in several modes. In the simplest one, the job parameters are fixed and the same tasks are performed on all mailpieces. In a more elaborated mode, each mailpiece bears a unique identifier and/or control codes (e.g. for adding more pages or inserts) that are read and interpreted by the inserter. In the most sophisticated (data driven) mode, the mailpiece bears a unique identifier that points to a database where the finishing instructions for that particular mailpiece are stored.

In a closed loop system, the production software generates a print job for the batch of mailpieces, and produces a job file that contains information about each mailpiece to be printed, typically a list of unique identifiers. As mailpieces enter a processing equipment such as a folder/inserter, their identifiers are scanned, the mailpieces are checked against the job file and the finishing instructions are executed. As mailpieces exit the machine, the ones that end up where they are intended (e.g. in an envelope) are marked as complete and others are marked as failed. This information is sent back to the production software in the form of another file. The production software uses this returned information to determine which mailpieces need to be reprinted. This loop can be repeated for each mailpiece as required to ensure all mailpieces end up where they are intended.

Closed loop systems typically require near real-time communications between the equipment performing the work and the computer systems managing the process. This can cause problems during implementation as, commonly, dedicated local computer networks are required. This adds to the expense and can complicate integration. These problems are exacerbated if a single close loop system is required to operate across multiple locations. Closed loop systems have in the past been reliant on the speed of this near real-time communication, with network traffic, distance, and network communication latency having the effect of slowing down equipment or causing it to stop working altogether.

A typical example of close loop system is given in U.S. Pat. No. 6,823,237, which describes a method and system for regenerating misprocessed mailpieces and the like. Control documents are produced by a data processing system and transported to an inserter system. The inserter system inputs the control documents and assembles mailpieces in accordance with coded information on the documents. If the inserter system controller identifies a misprocessed mailpiece it writes a record, which can be a separate zero byte file, to a common data store. The data processing system accesses the record in the common data stare and regenerates the control document. The inserter system processes the regenerated control document to regenerate the mailpiece. While mailings can be assigned by a site manager to various inserter systems, it is not provided that a single mailing may be split between several inserter systems, moreover across multiple sites.

There are several reasons why a mail batch may be processed across several locations. A large mailing of tens of thousands letters may be intended for customers living in many countries, regions or states. It can be desirable to split it according to destination addresses, in order to reduce cost and/or delivery time. Some of the mailpieces may require specific inserts or larger envelopes, which are not available at a given production site, or local equipment is not capable of handling them. Another reason is load balancing when the batch shah be expedited, or when there is a capacity shortage, or a slot available at a particular site. Furthermore, the production sites are often operated by service providers managing their own network of print facilities.

In a traditional mail factory environment, each site would be provided with a separate print job and a job file for the mailpieces allocated to it. Each site would then print the documents corresponding to its part of the batch, assemble the mailpieces according to the finishing instructions, and report for integrity once the job is completed. Failed or missing mailpieces would have to be reprocessed locally as either the print data or the finishing instructions would not be available at other sites. The production software would need to recompile all integrity reports to make sure all mailpieces in the batch have been duly processed. The whole process may take several days for a very large batch. Moreover, rescheduling and/or reallocation, as the case may be, of a part of the batch require extensive verifications. The method of the invention allows for simplifying these operations.

EP3029618 describes a mail production system which optimizes both handling of mailpieces and monitoring of the integrity of processed mailpieces within a vast multi-site environment. The system comprises a plurality of folder inserters each having reading devices for extracting job ID's and mailpiece ID's from mailpieces. Each folder inserter is in real-time connection with a processing node adapted to check out a relevant job file in a storage node, itself adapted to store job files containing information about the mailpieces. An interface node is connected to the storage node and adapted to import and export said job files. The communications between the processing node, the storage node and the interface node do not need to be in real-time.

The system of EP3029618 provides for the processing of a large mail batch on a plurality of folder inserters and across multiple sites. However, it is not completely satisfactory. Indeed, when a job file has been checked-out for exclusive use by a processing node, the latter becomes the primary processing node for the job, and all transactions relating to the checked-out job and mailpieces within the job processed by any other folder inserter are directed to be controlled and monitored by the primary processing node. In practice, the communications between the processing nodes themselves are not in real time and may also suffer some latency, notably when a large mail batch is processed across several locations simultaneously. Where this occurs, the machines connecting from remote sites may discover issues with the communication network that result in these machines running slowly.

There is therefore a need to optimize the communication flow between the inserters and the local or remote node servers managing the production of a large mail batch, moreover if the batch is processed on a plurality of inserters located at one or across multiple sites. In particular, there is a need to reduce the need of real-time communications between the inserters and the servers in the close loop mode where each and every mailpiece has to be checked against the job file for integrity purposes.

SUMMARY

It is therefore an object of at least one implementation of the invention to solve some problems of the prior art by providing a method and system by which a mail batch can be easily distributed to remote production equipment that can be located across multiple sites.

It is another object of at least one implementation of the invention to provide a method and system by which the integrity of the batch can be verified, whether it is processed on a single or a plurality of inserters, at one or across multiple sites.

It is another object of at least one implementation of the invention to provide a method and system by which the processing instructions pertaining to each mailpiece can be distributed to the one or many inserters processing the batch.

It is another object of at least one implementation of the invention to provide a method and system by which the mail batch can be processed without suffering delays due to communication network issues and without having to rely on local servers.

It is another object of at least one implementation of the invention to provide a method and system by which the print jobs and job files are prepared by production software available as Cloud applications such that the machines get their print jobs and processing instructions directly from the Cloud.

These objects are achieved by a method for producing mail batches on at least one inserter from a plurality of inserters equipped with scanners and located at multiple production sites each comprising at least one printer, the method comprising:

preparing a print job and a job file for a mail batch
allocating the mail batch to at least one production site with a production software running on a production server,
flagging the mailpieces in the job file for the at least one production site,
sending the print job to the at least one printer of the at least one production site,
printing the documents,
delivering the documents to at least one inserter of the at least one production site,
scanning a first mailpiece identifier on a first document,
sending an initial request to the production server including the first mailpiece identifier and identifying the inserter and the at least one production site,
verifying with the production software that the first mailpiece identifier is valid, and
sending back to the at least one inserter a confirmation message for processing the mailpiece,
wherein the confirmation message includes a list of valid mailpiece identifiers neighbouring the first mailpiece identifier in the job file.

Preferably the method further comprises extracting a job identifier from the first mailpiece identifier and verifying that the job identifier is valid.

Advantageously the list of valid mailpiece identifiers includes at least one mailpiece identifier following the first mailpiece identifier and/or one mailpiece identifier preceding the first mailpiece identifier in the job file.

Preferably the confirmation message further includes mailpiece identifiers which are no longer valid.

Advantageously the method further comprises scanning a second mailpiece identifier on a second document, verifying whether the second mailpiece identifier is included in the list of valid mailpiece identifiers and processing the mailpiece when included.

Advantageously the method further comprises sending a second request including the second mailpiece identifier to the production server if the second mailpiece identifier is not included in the list of valid mailpiece identifiers.

Advantageously the method further comprises sending back a confirmation message, including a new list of valid mailpiece identifiers neighbouring the second mailpiece identifier in the job file for processing the mailpieces.

Preferably the method further comprises sending a new request to the production server before the list of valid mailpiece identifiers is exhausted.

Advantageously the method further comprises diverting a document if the corresponding mailpiece identifier is notified as invalid in the confirmation message.

Preferably the method further comprises recording by the inserter the status of mailpiece as complete, failed or diverted.

Advantageously the method further comprises sending a status report of the already processed mailpieces to the production server along with a request for new mailpieces identifiers.

Advantageously verifying that the first mailpiece identifier is valid comprises verifying that the first mailpiece identifier is not cancelled or already processed by the at least one inserter or by another inserter from the plurality of inserters.

Advantageously the method further comprises determining by the production server an appropriate search window in the job file for the list of mailpiece identifiers to be sent back to the inserter, the size of which depends on the memory available in the inserter or bandwidth limitations.

Preferably an indication of the memory space available in the inserter is sent along with a request for valid mailpiece identifiers.

Advantageously the mail batch is produced simultaneously on a plurality of inserters located at multiple production sites.

Advantageously finishing instructions for processing the mailpieces are appended to the list of mailpiece identifiers.

Advantageously the confirmation message includes the full list of mailpiece identifiers included in the print job.

Advantageously the method further comprises verifying that the job identifier is valid comprises verifying that the job identifier is not cancelled or closed and that a print job corresponding to the job identifier has been sent to the at least one production site.

Advantageously the list of valid mailpiece identifiers is filtered to contain only mailpiece identifiers that have been flagged for the at least one production site.

Advantageously preparing the job file further comprises modification of the print job to change the mailpiece identifiers and/or the control codes on the documents according to equipment available at the at least one production site.

BRIEF DESCRIPTION OF THE DRAWINGS

The invention will be described and explained with additional specificity and detail through the use of the accompanying drawings in which.

DETAILED DESCRIPTION OF EXEMPLARY EMBODIMENTS

Figure 1:
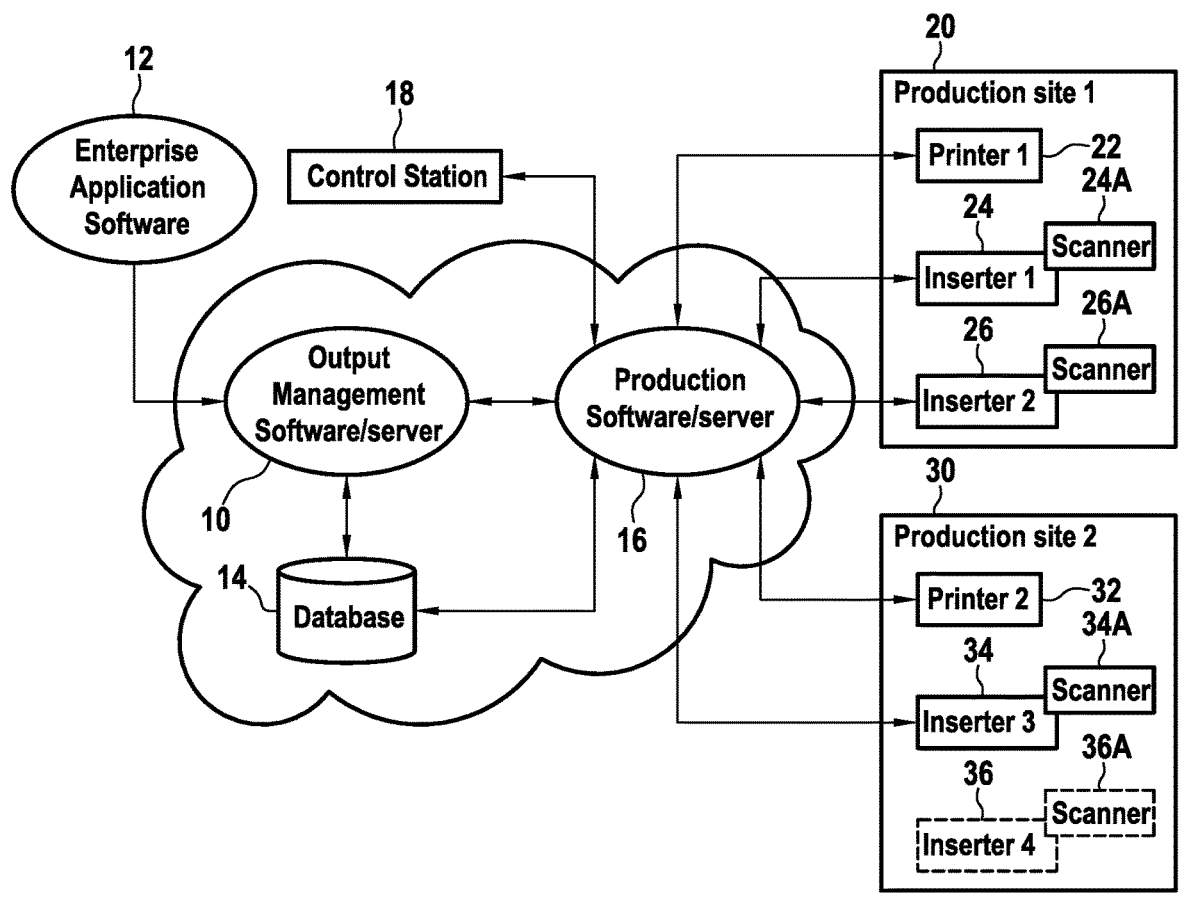
FIG. 1 is a general view of a system for producing mail batches according to the invention.

FIG. 1 is a general view of a system for producing mail batches according to the invention.

Data pertaining to a mail batch are supplied to an output management software 10 from an enterprise application software 12 such as an enterprise resource planning (ERP) or a customer relationship management (CRM) software. These data may include a list of customers with their delivery preferences (printed or electronic), postal or email addresses, messages to be printed on documents as well as indications of additional inserts to be included in the mailpieces. For convenience, only the physical delivery channel is represented here.

The output management software 10 prepares a print job corresponding to the mail batch and stores it in a job database 14 for further processing with a production software 16. The print job is typically a large PDF file which may contain tens of thousands of individual documents. In most cases, the documents are already ordered by destination addresses to benefit from postal pre-sort rates, and bear unique mailpiece identifiers, preferably including a job identifier, and/or control codes to be read and interpreted by the inserters. The output management software 10 prepares a job file for the batch of mailpieces and stores it in the job database 14. The job file contains the list of unique mailpiece identifiers to be checked by processing equipment for integrity purposes. In a specific embodiment, the job file also contains the finishing instructions about inserts to be added to the mailpieces and/or addresses to be printed on the envelopes. Ultimately, once the production is started, the job file contains the status of mailpieces (e.g. to be processed, pending, complete, hand-mailed, diverted, cancelled or failed/sent for reprint).

Additional instructions for the job can be stored in the job database 14. These additional instructions may include specific deadlines for sending the mailpieces, paper and print quality requirements, a variety of inserts to be used and preferred postal services (e.g. First Class, registered or priority mail). The job database may also contain the job parameters (e.g. fold type, insert types, envelope size . . . ) to be used for the batch. The print job together with the job file and the additional instructions constitute a mail job.

In a preferred embodiment, the output management software 12 and the production software 16 are available as Cloud applications running on physical servers remote from the production site(s). The job database 14 is also hosted in the same Cloud environment on the same or a different physical server. A supervisor connects to the production software 16 though a control station 18 and analyses the mail job to be produced. At this stage, the supervisor may decide to produce the corresponding mail batch on one or several production sites 20, 30. Each site may include one or more printers 22, 32 and one or more inserters 24, 26; 34, 36 equipped with scanners 24A, 26A; 34A, 36A. For convenience, only one printer per site has been represented. The decision to split the batch may be dictated by various considerations, such as a desire to produce the mailpieces near the destination addresses, the number of pages of each document, the availability of specific inserts at a given site, the capabilities of local equipment (e.g. printers and inserters), or simply load balancing between the production sites. This allocation to one or several production sites may also be automated according to predefined business rules. However the supervisor may always change this allocation if an unexpected event, such as a major malfunction or a shortage of supplies at one of the sites, occurs. Once the mail batch has been allocated, the job file is modified to flag the mailpieces for the production sites they are intended to.

In exceptional circumstances, the print job may need some modification to change the mailpiece identifiers and/or the control codes on the documents. This can be the case if a given equipment requires specific barcodes. This is preferably avoided by using standardized barcodes that can be read and interpreted by all inserters used for producing the mail batch.

In the system of the invention, each production equipment 22, 24, 26, 32, 34, 36 is in bidirectional communication with the production server, using secure protocols such as HTTPS. Once the mail batch has been allocated, the print job is sent to the printer(s) with a page selection corresponding to the mailpieces flagged for the production sites they are intended to. The corresponding documents are printed. Each printer 22, 32 preferably reports the ones successfully printed to the production software 16. The documents are then delivered to the folder/inserter(s). An operator may type the job ID or scan a first mailpiece identifier to access the job parameters and prepare the machine for production. For many mailings however, the job parameters are fixed and only the number of pages varies from one mailpiece to another. The operator then places the document in the main feeder and starts the inserter.

As the first document enters the inserter, its identifiers are scanned by the associated scanner. The inserter sends a request to the production server including the job and mailpiece identifiers, and also identifying the inserter and the production site. The production software verifies that the job is valid (not cancelled or closed, and allocated to that production site) and that the mailpiece is valid (not cancelled or already processed by another inserter). The production server sends back a confirmation message for the inserter to process the mailpiece, or otherwise an error message for the inserter to divert the document. In a specific embodiment, the confirmation message may include the finishing instructions for that particular mailpiece. The job then continues for the following documents as will be explained hereafter.

Figure 2:
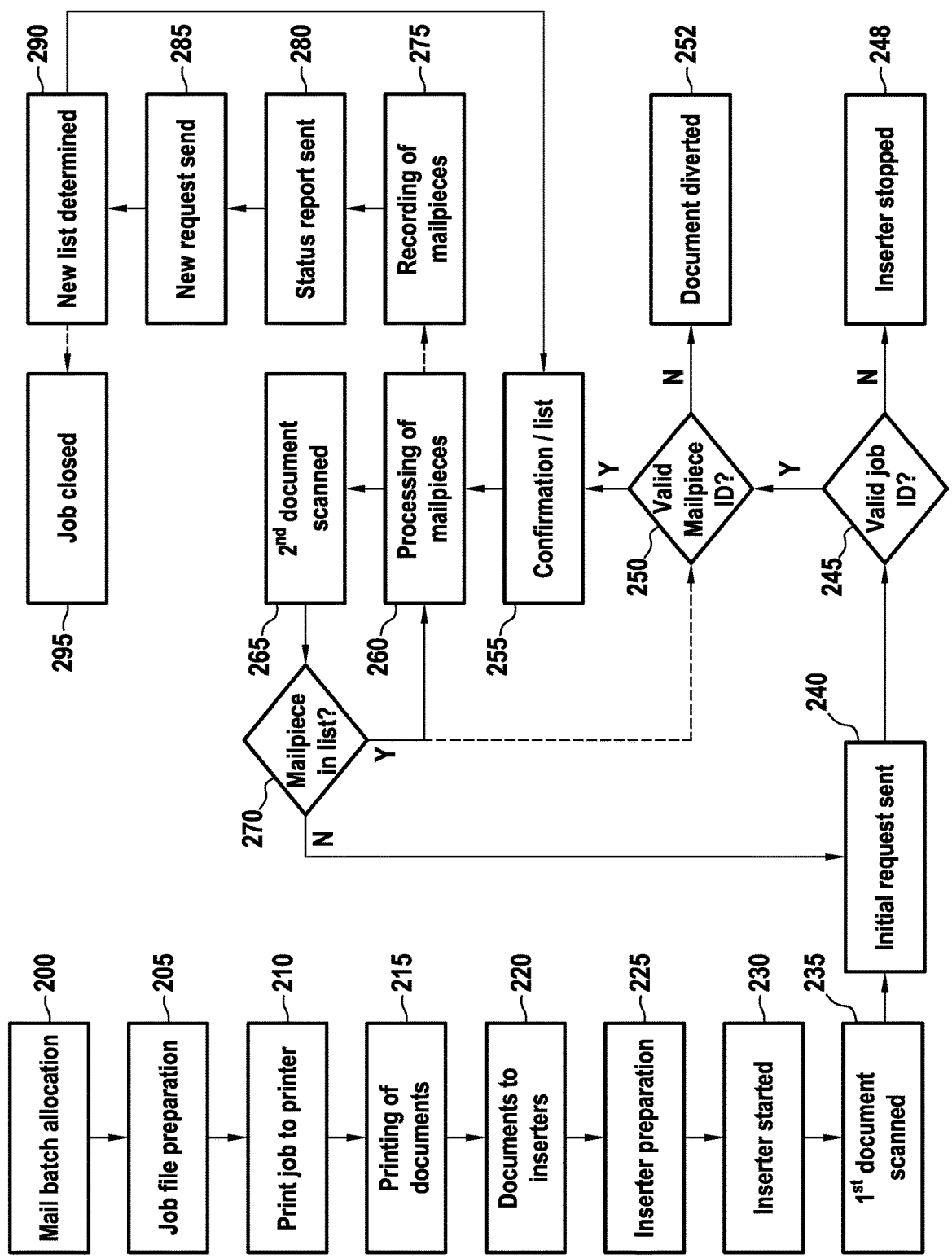
FIG. 2 is a flowchart of a method for producing mail batches according to the invention; and, FIG. 3 is a flowchart of a method for determining valid mailpiece identifiers to be sent back to the inserters, as required by the method of FIG. 2.

FIG. 2 is a flowchart of a method for producing mail batches according to the invention.

In this example, there are no finishing instructions in the job file, but merely the list of unique mailpiece identifiers to be checked by the processing equipment's for integrity purposes. Finishing instructions are either the same for all mailpieces, or printed as control codes on the document pages. Control codes are generally printed in the form of separate barcodes or OMR marks to be read and interpreted directly by the inserter. They can also be appended to the mailpiece identifiers in a single barcode.

The method starts at act 200 when the mail batch is allocated to one or several production sites by a supervisor. This allocation can also be performed automatically according to predefined business rules.

At act 205, the job file is prepared by flagging the mailpieces for a particular production site. This act optionally includes a modification of the print job to change the mailpiece identifiers and/or the control codes on the documents, according to the equipment available at the site. This would only concern mailpieces allocated to that particular production site, and is preferably avoided by using standardized barcodes that can be read and interpreted by all inserters used for producing the mail batch.

At act 210, the print job is sent to a printer of the production site with a page selection corresponding to the mailpieces flagged for that particular production site.

At act 215, the documents are printed by the printer. This act optionally includes sending a report about the document successfully printed to the production server when the task is completed or at regular intervals. The printing of a large mail batch can indeed take several hours and be interrupted for various reasons, like the need to reload paper.

At act 220, the documents are delivered to one or more inserters of the production site.

At act 225, an operator prepares one inserter for producing the batch. This may include typing a job ID or scanning a first mailpiece identifier to access the job parameters. The inserter may connect to the production software, or this information be communicated by other means. The operator may also select one in a list of preregistered job types.

At act 230, the operator then places the documents in the main feeder, and optionally inserts in the insert feeder(s), and starts the inserter.

At act 235, the inserter feeds a first document and scans its identifiers.

At act 240, the inserter sends an initial request to the production server including the job and mailpiece identifiers, and identifying the inserter and the production site.

At act 245, the production software verifies that the job identifier is valid (not cancelled or closed, and allocated to that production site). If the answer is yes, the method continues at act 255. Otherwise an error message is returned at act 248 and the inserter stops.

At act 250, the production software verifies that the mailpiece identifier is valid (not cancelled or already processed). If the answer is yes, the method continues at act 255. Otherwise, an error message is returned at act 252 to divert the document.

At act 255, the production server sends back a confirmation message for the inserter to process the mailpiece. In a preferred embodiment, the confirmation message includes a list of valid mailpiece identifiers neighbouring the one that have been scanned. The confirmation message may also notify mailpiece identifiers which are no longer valid for the corresponding documents to be diverted by the inserter.

At act 260, the inserter processes the mailpiece by feeding and collating all subsequent document pages, additional inserts if required, folding and inserting the set into an envelope.

At act 265, the inserter feeds a second document and scans its identifiers. This act may be performed in parallel, or even before, the completion of act 260 according to the capacity of the inserter. Indeed, more than one mailpiece may be in-process at the same time.

At act 270, the inserter checks whether the mailpiece identifier corresponding to the second document is included in the list communicated by the production server at act 255. If the answer is yes and the mailpiece identifier is valid, the process loops at act 260. Otherwise, the process loops at act 240 where the inserter sends a second request for valid mailpiece identifiers to the production server, including a second mailpiece identifier. This second request may correspond to the second document fed by the inserter, or to any following document bearing a mailpiece identifier which is not included in the list communicated by the production server at act 255. The mailpiece identifier may also be notified as invalid in the confirmation message. In this case the inserter will divert the document like at act 252, without requiring any further verification by the production software.

At act 275, the inserter records the status of mailpiece(s) as complete, failed or diverted. Complete mailpieces are the ones that have been properly inserted. Failed mailpieces are the ones which encountered some malfunction and need to be completed by hands or reprinted.

Documents corresponding to invalid mailpiece identifiers are diverted and the mailpieces reported as such.

At act 280, the inserter sends a status report of the already processed mailpiece(s) to the production server and a new request for more valid mailpiece identifiers at act 285. This new request and the status report are preferably included in the same message, to optimize the communication flow. These acts preferably take place at predetermined conditions before the list of valid mailpiece identifiers included in the list sent at act 255 is exhausted, in order to minimize downtimes. For instance the status is sent when there remain a few dozens of unprocessed mailpieces from that list. The inserter keeps running and processing the mailpieces based on the information previously received and recording their status. If the connection with the production server is temporarily lost for any reason, the latest available status report can be sent along with a new request as soon as the connection is recovered.

At act 290, the production software determines a new list of valid (and/or invalid) mailpiece identifiers. This list is based on the status report of act 280, status reports already received from the same inserter, and status reports from other inserters located at the same or other sites. The production server then sends it back to the inserter, looping at act 260. The inserter uses the information received in the new list to process the following mailpieces.

Eventually at act 295, the operator closes the job at that particular inserter, after all documents belonging to the batch have been inserted, and mailpieces manually completed during the process reported as hand-mailed. This does not prevent other inserters located at the same or other sites to keep producing the same batch simultaneously. The production software keeps monitoring the production of the batch until all mailpieces identifiers in the job file have been reported as complete (or flagged as cancelled).

In this manner, the inserter is constantly supplied with new mailpiece identifiers without having to communicate in real-time with the production software for checking each and every mailpiece, and can operate continuously until all documents printed at act 220 have been processed, by itself or other inserters located at the same production site. The production software keeps a dynamic record of all complete mailpieces included in the batch.

Failed mailpieces can be flagged for reprint and the corresponding documents sent as another print job to the printer at the first site they were allocated to, or at another site. Documents missing in the status reports can be identified, and sent for reprint at the same or at a later time.

It shall be noted that the same method may be employed for data driven insertion. In this case, finishing instructions may be appended to the list of valid mailpiece identifiers at act 260. This is particularly appropriate when for instance specific inserts need to be added or recipient addresses need to be printed on the envelopes.

Figure 3:
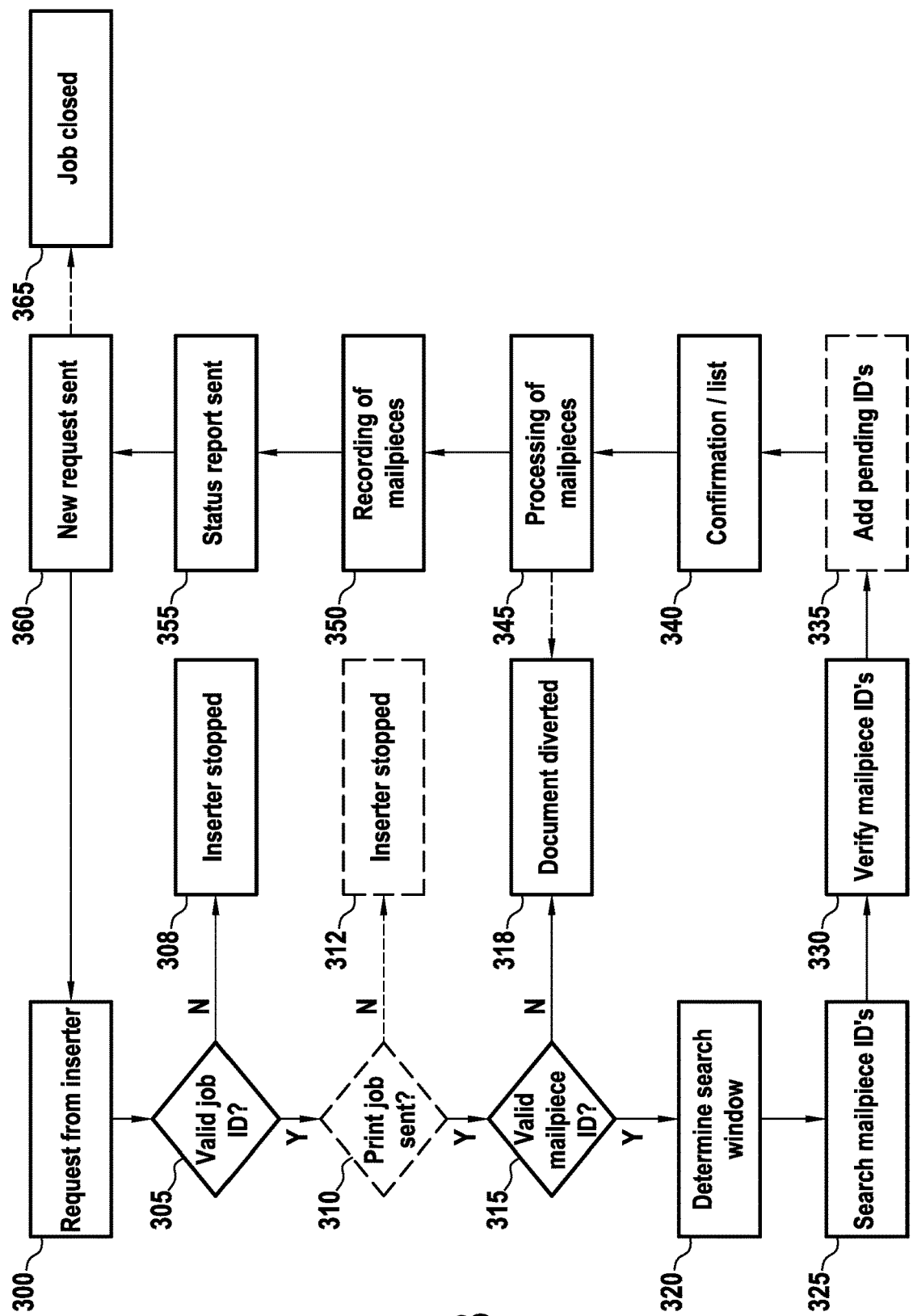

FIG. 3 is a flowchart of a method for determining valid mailpiece identifiers to be sent to the inserters, as required by the method of FIG. 2 at act 255 and/or 290.

At act 300, the production server receives a request for valid mailpiece identifiers from the inserter. The request includes a job identifier and first mailpiece identifier, and identifies the inserter and the production site. This act occurs after a first document has been fed and its identifiers scanned. Alternatively, the request may include a mailpiece identifier scanned on a second document, or a mailpiece identifier previously sent back to the inserter but not yet scanned, as will be explained thereafter.

At act 305, the production software verifies that the job identifier is valid (not cancelled or closed, and allocated to that production site). If the answer is yes, the method continues at act 310. Otherwise an error message is returned at act 308 and the inserter stops.

Optionally at act 310, the production software verifies that a print job corresponding to the job identifier has been sent to that particular production site. If the answer is yes, the method continues at act 315. Otherwise an error message is returned at act 312 and the inserter stops. Indeed, if such print job has not been sent yet, the first document may be a sample used for a test run. The operator may then force the inserter to process a mailpiece.

At act 315, the production software verifies that the mailpiece identifier is valid (not cancelled or already processed). If the answer is yes, the method continues at act 320. Otherwise, an error message is returned at act 318 for the inserter to divert the document.

This act optionally includes verifying that the document corresponding to that mailpiece ID was flagged in the job file for that particular production site, and whether a report about the documents successfully printed has been received. However, such report may not be readily available, or not complete, or the same document may have been printed at several production sites for various reasons.

At act 320, the production software determines an appropriate search window for the list of mailpiece identifiers to be sent back to the inserter. The window shall contain the mailpiece identifier included in the request received at act 300, and a number of neighbouring mailpiece identifiers in the job file. The size of the window depends on various factors, such as the memory available in the inserter or bandwidth limitations. In a typical embodiment, the full list of mailpiece identifiers included in the print job is sent back. This might be inappropriate for very large batches. In another embodiment, for instance when finishing instructions are appended to the list, only a limited number of mailpiece identifiers may be sent back, to optimize the communication flow. More particularly, the list of valid mailpiece identifiers includes at least one mailpiece identifier following the first mailpiece identifier and/or one mailpiece identifier preceding the first mailpiece identifier in the job file.

At act 325, the production software searches in the job file for mailpiece identifiers neighbouring the mailpiece ID included in the request. The documents are usually printed in sequence with mailpiece identifiers in chronological order. However, many deviations are possible. For instance, the document may be printed in reverse order, starting from the bottom of the PDF file. The documents may be printed in direct order, but the mailpiece identifiers numbered in reverse order in the job file. The document identifiers may also follow another logic, such as customer identifiers, and some numbers be absent from the sequence. In any case, the order of the documents in the job file reflects their order in the print job as prepared by the output management software. In a typical case, when the documents are printed in direct order, the list will include a number of following mailpiece identifiers, but may also include a smaller number of preceding mailpiece identifiers, to cope with documents improperly placed in the feeder or inverted.

At act 330, the production software verifies that all mailpiece identifiers included in the window are valid, meaning that they have not been reported as already complete by the same or another inserter, completed by hand or cancelled. A mailpiece, or a whole group of mailpieces, may be cancelled if the sender eventually decides not to send them. This may occur after the production of the mail batch has started, in which case the supervisor can flag the mailpieces as cancelled in the job file. Mailpiece identifiers which are no longer valid are notified as such for the corresponding documents to be diverted by the inserter.

In a specific embodiment, the list may be filtered to contain only mailpiece identifiers that have been flagged for a particular production site. These identifiers normally correspond to the documents that have been previously sent in a print job to the same site (and successfully printed). This may be useful to optimize to communication flow, notably when finishing instructions are appended to the list. In an ideal world, there is no overlap between the various sites, documents are printed and inserted where intended. However, disruptions during the production of a large batch may render this approach ineffective.

Optionally at act 335, the production software checks whether any pending mailpiece identifier shall be added to the list. Pending mailpiece identifiers are the ones missing in status reports previously sent by the same of other inserters. This may happen because the corresponding documents were not printed successfully, or some malfunction occurred during insertion and the mailpieces were reported as failed. However this is only appropriate if the corresponding documents have been sent for reprint to that particular production site.

This act can be delayed until a significant part of the mail batch has been produced.

At act 340, the production server sends back a confirmation message to the inserter, including a list of valid mailpiece identifiers determined during the preceding acts for the inserter to process the mailpieces. The confirmation message also includes mailpiece identifiers notified as invalid for the documents to be diverted by the inserter.

At act 345, the inserter processes the mailpieces by feeding and collating all subsequent document pages, additional inserts if required, folding and inserting the sets into envelopes. Documents corresponding to invalid mailpiece identifiers are diverted.

At act 350, the inserter records the status of mailpiece(s) as complete, failed or diverted.

At act 355, the inserter sends a status report of the already processed mailpiece(s) to the production server. If more documents need to be inserted, a new request for more valid mailpiece identifiers may be sent at act 360 and preferably included in the same message. The new request may include the first mailpiece identifier from the previous list that has not been scanned yet by the inserter. The method loops then at act 300.

Mailpieces identifiers already included in a previous list and reported as complete may be notified as invalid in the new list. Adversely, mailpieces identifiers included in a previous list may still be valid in the new list. The inserter always takes into account the latest of the status received from the production server or recorded by itself.

Eventually at act 365, the operator closes the job at that particular inserter, after all documents belonging to the batch have been inserted and mailpieces manually completed during the process reported as such. This does not prevent other inserters located at the same or other sites to keep producing the same batch simultaneously. The production software keeps monitoring the production of the batch until all mailpieces identifiers in the job file have been reported as complete (or flagged as cancelled).

The same method can be used if a mailpiece identifier not included in a list previously sent to the inserter is scanned at act 345. This may occur if the batch of mailpieces is split between several inserters at the same production site. The method will restart at act 300 with a new request received from the inserter and including said mailpiece identifier. In a specific embodiment, the inserter will complete the mailpieces in process, report their status and clear mailpiece identifiers included in a previous list that have not been scanned. Otherwise, the inserter may keep these mailpiece identifiers in memory till the job is closed.

In a specific embodiment, an indication of the memory space available in the inserter is sent along with the initial or new request for valid mailpiece identifiers, and the size of the search window is determined accordingly. The inserter preferably clears its memory from all mailpiece identifiers (and finishing instructions if applicable) reported as complete at acts 280 or 355. However, this may happen only after the inserter receives an acknowledgement from the production server, so that no information is lost due to connection issues.

While in the description the printers are only communicating with the production server, the print job may be sent to the printers by the output management server after the allocation has been done. The print job may also be split in several print jobs intended to the different sites according to the allocation.

The system and method of the invention is particularly useful in disaster recovery situations; when there is a major problem at one production site and the job(s) must be redirected to other ones. It ensures that a particular mailpiece will be inserted (if not printed) only once while allowing high production throughput and flexibility in normal circumstances. European patent application 22 305 086.5 is incorporated herein by reference in its entirety.

The invention claimed is:

1. A method for producing mail batches on at least one inserter from a plurality of inserters equipped with scanners and located at multiple production sites each comprising at least one printer, the method comprising:
    preparing a print job containing several individual documents and a job file for a mail batch
    allocating the mail batch to at least one production site with a production software running on a production server,
    flagging the mailpieces for the at least one production site,
    sending the print job to the at least one printer of the at least one production site,
    printing the individual documents,
    delivering the individual documents to at least one inserter of the at least one production site,
    scanning a first mailpiece identifier on a first document,
    sending an initial request to the production server including the first mailpiece identifier and identifying the inserter and the at least one production site,
    verifying with the production software that the first mailpiece identifier is valid, and
    sending back to the at least one inserter a confirmation message for processing the mailpiece,
    wherein the confirmation message includes a list of valid mailpiece identifiers neighbouring the first mailpiece identifier in the job file.

2. The method of claim 1, further comprising extracting a job identifier from the first mailpiece identifier and verifying that the job identifier is valid.

3. The method of claim 1, wherein the list of valid mailpiece identifiers includes at least one mailpiece identifier following the first mailpiece identifier and/or one mailpiece identifier preceding the first mailpiece identifier in the job file.

4. The method of claim 1, wherein the confirmation message further includes mailpiece identifiers which are no longer valid.

5. The method of claim 1, further comprising scanning a second mailpiece identifier on a second document, verifying whether the second mailpiece identifier is included in the list of valid mailpiece identifiers and processing the mailpiece when included.

6. The method of claim 5, further comprising sending a second request including the second mailpiece identifier to the production server if the second mailpiece identifier is not included in the list of valid mailpiece identifiers.

7. The method of claim 6, further comprising sending back a confirmation message, including a new list of valid mailpiece identifiers neighbouring the second mailpiece identifier in the job file for processing the mailpieces.

8. The method of claim 1, further comprising sending a new request to the production server before the list of valid mailpiece identifiers is exhausted.

9. The method of claim 1, further comprising diverting a document if the corresponding mailpiece identifier is notified as invalid in the confirmation message.

10. The method of claim 1, further comprising recording by the inserter the status of mailpiece as complete, failed or diverted.

11. The method of claim 10, further comprising sending a status report of the already processed mailpieces to the production server along with a request for new mailpieces identifiers.

12. The method of claim 1, wherein verifying that the first mailpiece identifier is valid comprises verifying that the first mailpiece identifier is not cancelled or already processed by the at least one inserter or by another inserter from the plurality of inserters.

13. The method of claim 1, further comprising determining by the production server an appropriate search window in the job file for the list of mailpiece identifiers to be sent back to the inserter, the size of which depends on the memory available in the inserter or bandwidth limitations.

14. The method of claim 13, wherein an indication of the memory space available in the inserter is sent along with a request for valid mailpiece identifiers.

15. The method of claim 1, wherein the mail batch is produced simultaneously on a plurality of inserters located at multiple production sites.

\* \* \* \* \*